United States Patent [19]

Trajere

[11] Patent Number: 5,611,296
[45] Date of Patent: Mar. 18, 1997

[54] PSITTACINE FEEDING DEVICES AND METHOD

[76] Inventor: Cherane Trajere, 530 Acacia Rd., Vero Beach, Fla. 32983

[21] Appl. No.: 441,532

[22] Filed: May 15, 1995

[51] Int. Cl.⁶ .................................................. A01K 39/00
[52] U.S. Cl. ...................................................... 119/51.01
[58] Field of Search ........................ 119/51.01; 222/572, 222/158; 73/426, 427

[56] References Cited

U.S. PATENT DOCUMENTS

| | | | |
|---|---|---|---|
| 2,459,073 | 1/1949 | Hamilton | 222/572 |
| 3,700,146 | 10/1972 | Cousins et al. | 222/465 |
| 4,957,224 | 9/1990 | Kessler et al. | 222/572 X |
| 5,158,216 | 10/1992 | Viani | 222/572 X |
| 5,549,216 | 8/1996 | Scholl | 222/572 X |

*Primary Examiner*—Thomas Price
*Attorney, Agent, or Firm*—Carroll F. Palmer

[57] ABSTRACT

An improved method for the feeding of psittacines involves the use of a feeding device having a spout that may be grasped by the mandibles of the psittacine to prompt it to pump feed flowing from the vessel down its esophagus. This method mitigates damage to the avian choana and esophagus often caused by conventional use of syringes and cannula for juvenile psittacine feeding. Details are disclosed of the relevant feeding device which includes the spout designed to permit flow of psittacine feed to the bird plus, advantageously, a handle opposed to the spout and a unique cover.

5 Claims, 2 Drawing Sheets

U.S. Patent    Mar. 18, 1997    Sheet 1 of 2    5,611,296
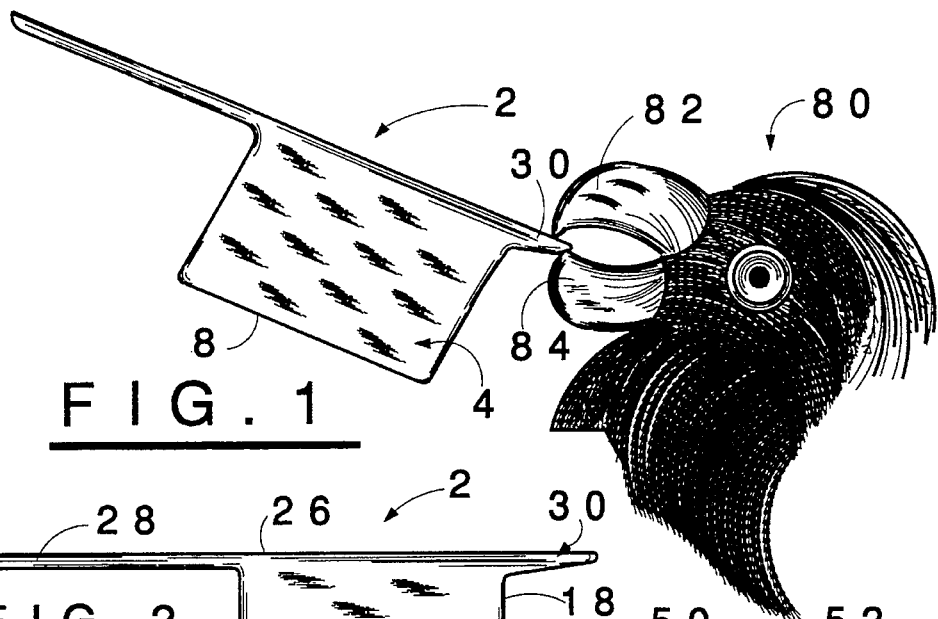
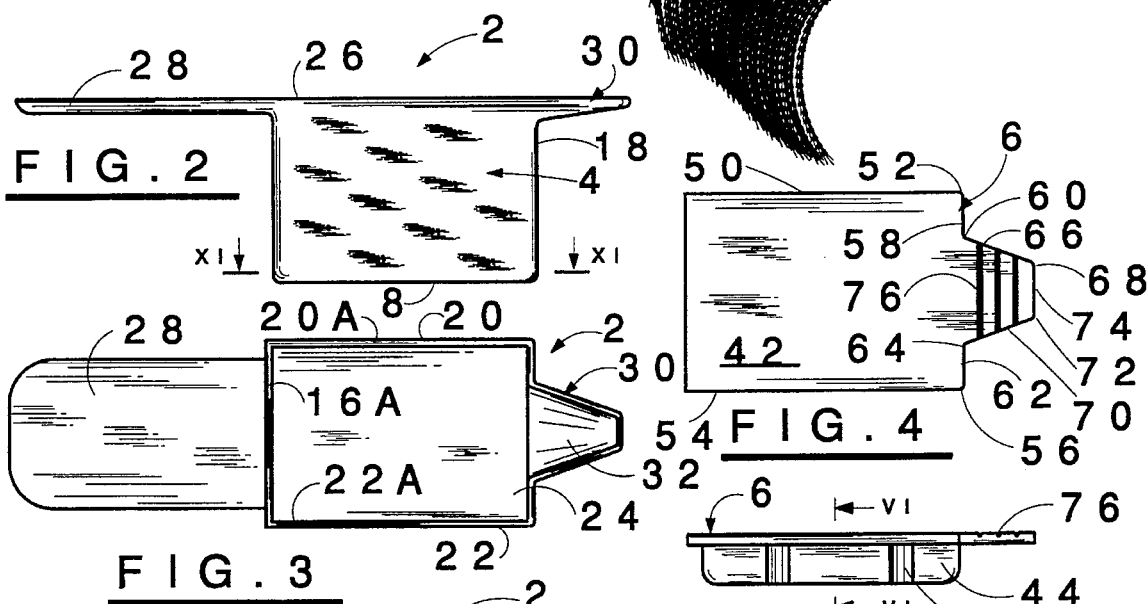

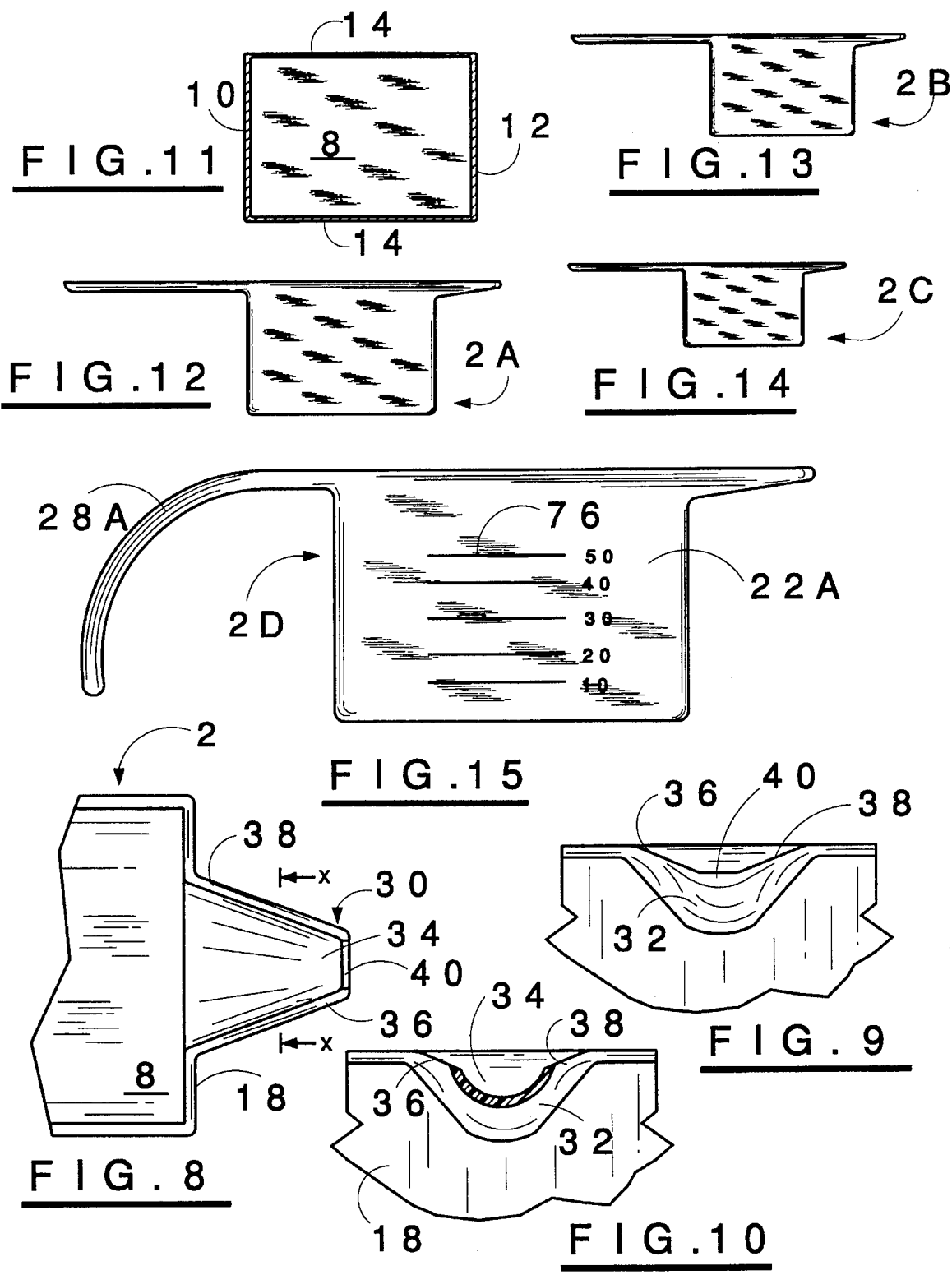

PSITTACINE FEEDING DEVICES AND METHOD

BACKGROUND OF THE INVENTION

1. Field of the Invention

This application relates to exotic bird feeding devices and method. More particularly, it concerns a new type of device for feeding psittacines and a new method of feeding such birds and a method of feeding using such devices.

2. Description of the Prior Art

The keeping of exotic birds as pets has increased in popularity to the point where demand for such birds can no longer be met by capture from the wild. Therefore, to meet the demand, the vast majority of marketable exotic birds, particularly the psittacines, are now provided by professional breeders who obtain eggs from captive breeding pairs, incubate the eggs and raise to hatchlings from day zero to marketable age, i.e., 4–12 months. Such avian breeding requires extensive care of the young birds, including numerous and time consuming feedings.

Due to the structure of the digestive tract of psittacines and some other exotic birds, the feeding of new hatchlings is not comparable to feeding adult birds who can feed themselves with food supplied in trays. Thus, typical exotic bird aviaries force feed the young birds by inserting flexible or rigid cannulas down the bird's throat and forcing mushy food through the cannulas via a connected syringe. However, such conventional feeding practice involves a variety of problems that nevertheless are tolerated by the aviaries for want of something better. For example, the feeding syringes constitute a source of dangerous bacteria and must be constantly disinfected. Also, the syringe plungers are prone to sticking resulting in undesirable "plunging" during food delivery. Further, it is important that the food when feed to the birds have a temperature between about 105°–110° F. and this is difficult to attain with the current syringe and cannula feeding arrangements.

OBJECTS

A principal object of the invention is the provision of a new type of device for feeding psittacines and a new method of feeding such birds.

Further objects include the provision of new psittacine feeding devices and methods that:

1. Permit easy control of proper temperature of the food.

2. Mitigate transfer of destructive bacteria to juvenile birds during their feeding.

3. Decrease the time required for feeding of birds as compared with currently available feeding devices and methods.

4. Eliminate the problem of "plunging" of the food into the bird's mouth or throat.

5. Encourage the psittacine to "pump" the food via touching of its upper and lower mandibles as a step in the feeding procedure.

6. Mitigate damaging the choana and esophagus of juvenile birds during feeding.

7. Simplify the equipment needed for the psittacine feedings and reduce the expense of such operations.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of an improved device for feeding psittacines comprising a handled vessel and a cover.

The vessel has an orthogonal base, advantageously rectangular in area, defined by back, front and opposed side peripheral edges, a back wall, a front wall and two opposed sidewalls, all of equal heights, upstanding integrally from the back, front and opposed side peripheral edges respectively of the base.

Each sidewall includes an unattached upper end and an opening in the top of the vessel that substantially mimics the area of the base is defined by the upper ends of the four sidewalls.

A spout extends integrally and laterally from the front sidewall and, advantageously, a handle extends integrally and laterally from the back sidewall. Alternatively, especially in the smaller embodiments, the feeding vessels of the invention may omit the handle, in which case the vessel is manipulated by fingering the sides thereof.

The spout is defined by a concave base that extends integrally and laterally while sloping upwardly from the front sidewall plus a truncated triangular top opening having a first angled side portion, a second angled side portion and a front lip portion.

The cover comprises a top surface and sidewalls depending therefrom. Such top surface has (1) a back peripheral edge, a first side peripheral edge with a first forward end and a second side peripheral edge with a second forward end, which edges substantially mimic the back and side peripheral edges of the base, (2) a first forward peripheral edge that terminates at a first inner end and projects from the first forward end normally of the first side peripheral edge and has a length less than the length of the front peripheral edge of the base, (3) a second forward peripheral edge that terminates at a second inner end and projects from the second forward end normally of the second side peripheral edge and has a length equal to the length of the first forward peripheral edge, (4) a first angled peripheral edge having a length less than the length of the first angled side portion and that terminates at a first front end, (5) a second angled peripheral edge having a length equal to the length of the first angled peripheral edge and that terminates at a second front end, and (6) a spout peripheral edge that connects the first front end to the second front end.

The cover sidewalls include lateral lugs that serve to retain the cover in position upon the vessel. Also, the cover includes a plurality of severance indentations that parallel the spout peripheral edge that enable the spout peripheral edge to be enlarged by breaking off portions of the cover that extend forward of such indentations.

The method of feeding psittacines in accordance with the invention comprises in combination the steps of:

(1) providing a feeding device comprising a vessel, a handle extending from one side thereof and a spout extending from the side opposite to the handle, (2) charging the vessel with psittacine feed, (3) placing the device relative to a psittacine to permit it to grasp the spout by its mandibles, (4) manipulating the device to cause the charged feed to flow via the spout through the mandibles into the esophagus of the psittacine, (5) continuing the feed flow while the psittacine is prompted by the touching of its mandibles to pump the feed down its esophagus, and (6) removing the device from the psittacine's mandibles upon consumption by it of a predetermined quantity of the feed.

BRIEF DESCRIPTION OF THE DRAWINGS

A more complete understanding of the invention can be obtained by reference to the accompanying drawings in which:

FIG. 1 is a fragmentary lateral view of a psittacine being feed using a feeding device of the invention.

FIG. 2 is a lateral view of first embodiment of a psittacine feeding device of the invention.

FIG. 3 is a plan view of a psittacine feeding device of the invention.

FIG. 4 is a plan view of the cover for the psittacine feeding device of FIG. 3.

FIG. 5 is a lateral view of the cover for the psittacine feeding device of FIG. 3.

FIG. 6 is a sectional view taken on the line VI—VI of FIG. 5.

FIG. 7 is a plan view of a psittacine feeding device of FIG. 3 with the cover of FIG. 4 in place.

FIG. 8 is a fragmentary enlarged plan view of the spout portion of the psittacine feeding device of FIG. 3.

FIG. 9 is a fragmentary enlarged front end view of the spout portion of the psittacine feeding device of FIG. 3.

FIG. 10 is a sectional view taken on the line X—X of FIG. 8.

FIG. 11 is a sectional view taken on the line XI—XI of FIG. 2.

FIG. 12 is a lateral view of third embodiment of a psittacine feeding device of the invention.

FIG. 13 is a lateral view of fourth embodiment of a psittacine feeding device of the invention.

FIG. 14 is a lateral view of fifth embodiment of a psittacine feeding device of the invention.

FIG. 15 is a lateral view of sixth embodiment of a psittacine feeding device of the invention.

DESCRIPTION OF THE PREFERRED EMBODIMENTS

For a detailed description of the invention, reference is made to the drawings in which generic parts of the illustrated matter are indicated by arrowhead lines associated with the designation numerals and specific parts are indicated with plain lines associated with the numerals.

The device 2 for feeding psittacines comprises a handled vessel 4 and a cover 6.

Vessel 4 has an orthogonal base 8 defined by back 10, front 12 and opposed side peripheral edges 14, a back wall 16, a front wall 18 and two opposed sidewalls 20 & 22. The sidewalls include unattached upper ends 16A, 18A, 20A and 22A respectively which define the opening 24 in the top 26 of vessel 4.

A handle 28 extends integrally and laterally from the back sidewall 16.

A spout 30 (see FIGS. 8-10), which extends integrally and laterally from the front sidewall 18, has a concave base 32 that extends integrally and laterally while sloping upwardly from the front sidewall 18. The spout's truncated triangular top opening 34 has a first angled side portion 36, a second angled side portion 38 and a front lip portion 40.

The cover 6 (see FIGS. 4–7) comprises a top surface 42 and depending sidewalls 44 bearing lateral lugs 46 that serve to retain the cover 6 in position upon the vessel 4.

The top surface 42 is defined by a back peripheral edge 48, a first side peripheral edge 50 having a first forward end 52 and a second side peripheral edge 54 having a second forward end 56, Edges 48, 50 & 54 substantially mimic the back and side peripheral edges 16, 20 & 22 respectively of the base 8.

In cover 6, a first forward peripheral edge 58 terminates at a first inner end 60 and projects normally from the first forward end 52. Also, cover 6 includes a second forward peripheral edge 62 that terminates at a second inner end 64, a first angled peripheral edge 66 that terminates at a first front end 68, a second angled peripheral edge 70 that terminates at a second front end 72, and a spout peripheral edge 74 that connects the front ends 68 & 72.

The cover 6 includes a plurality of severance indentations 76 that parallel the spout edge that enable the spout peripheral edge 74 to be enlarged by removal of portions of the cover forward of the indentations 76.

FIGS. 12–14 show additional size devices 2A, 2B & 2C of the invention that may, if desired, be nested when their covers are removed.

FIG. 15 shows a relatively large size device 2D of the invention which comprises a curved handle 28A and volume indicia 70 engraved or printed on its side 22A. Any other devices of invention may be similarly embellished.

The new method of the invention for feeding psittacines can be explained by reference primarily to FIG. 1. This comprises a combination steps beginning with (a) providing a feeding device 2 comprising a vessel 4 that has a spout 30 extending from on side, (a) charging the vessel 4 with psittacine feed (not shown), (c) placing the device 2 relative to a psittacine 80 to permit it to grasp the spout 30 by its upper and lower mandibles 82 & 84, (d) manipulating the device, e.g., tipping it forward as shown, to cause the charged feed to flow via the spout 30 through the mandibles into the esophagus (not shown) of the psittacine, (e) continuing the feed flow while the psittacine is prompted by the touching of its mandibles to spout 30 to pump the feed down its esophagus, and (f) removing the device from the mandibles upon consumption by the psittacine of a predetermined quantity of the feed.

The new method is advantageously conducted with orthogonal vessel feeding devices of the invention, but may also be practiced with vessels having cylindrical, hexagonal or other cross-section provided with a spout or equivalent element that may be grasped by the bird's mandibles.

The new feeding method as described improves upon typical prior feedings of psittacines, particularly juveniles. Thus, instead of forcing the food down the avian, the new method and device prompts the avian to muscularly move (pump) the food along its esophagus. Hence, damage of the bird's choana and/or esophagus is mitigated because no foreign object is required to enter its body to perform the feeding operation. Further, since use of syringes and cannulae, which constitute an ever potential source for disease bacteria, virus, etc., are unnecessary, this contamination problem is also mitigated. Additionally, the new method makes it easier to maintain the feed at the desired temperature of 95°–110° F. throughout the feeding operation. Moreover, as compared to prior used psittacine feeding methods, feeding time is shortened, "plunging" of food by a syringe is eliminated, control of food delivery to the avian is improved and aspiration is eliminated.

I claim:

1. A device for feeding psittacines comprising a handled vessel and a cover:

said vessel having:
- an orthogonal base defined by back, front and opposed side peripheral edges,
- a back wall, a front wall and two opposed sidewalls, all of equal heights, upstanding integrally from said back, front and opposed side peripheral edges respectively, each said sidewall including an unattached upper end,
- a vessel top opening defined by said upper ends of said four sidewalls that substantially mimics the area of said base, and
- a spout extending integrally and laterally from said front sidewall, said spout being defined by:
- a concave base that extends integrally and laterally while sloping upwardly from said front sidewall, and
- a truncated triangular top opening having a first angled side portion, a second angled side portion and a front lip portion, said cover comprising a top surface and sidewalls depending therefrom:

said top surface being defined by:
- a back peripheral edge, a first side peripheral edge having a first forward end and a second side peripheral edge having a second forward end, which edges substantially mimic said back and side peripheral edges of said base,
- a first forward peripheral edge that terminates at a first inner end and projects from said first forward end normally of said first side peripheral edge and has a length less than the length of said front peripheral edge of said base,
- a second forward peripheral edge that terminates at a second inner end and projects from said second forward end normally of said second side peripheral edge and has a length equal to the length of said first forward peripheral edge,
- a first angled peripheral edge having a length less than the length of said first angled side portion and that terminates at a first front end,
- a second angled peripheral edge having a length equal to the length of said first angled peripheral edge and that terminates at a second front end, and
- a spout peripheral edge that connects said first front end to said second front end.

2. The device of claim 1 wherein said orthogonal base is rectangular and a handle extends integrally and laterally from said back sidewall.

3. The device of claim 1 wherein said cover includes a plurality of severance indentations that parallel said spout peripheral edge that enable said spout peripheral edge to be enlarged by portions of said cover forward of said indentations.

4. The device of claim 1 wherein said cover sidewalls include lateral lugs that serve to retain said cover in position upon said vessel.

5. A method of feeding juvenile psittacines which comprises in combination the steps of:

a. providing a feeding device comprising a handled vessel and a cover:

said vessel having:
- an orthogonal base defined by back, front and opposed side peripheral edges,
- a back wall, a front wall and two opposed sidewalls, all of equal heights, upstanding integrally from said back, front and opposed side peripheral edges respectively, each said sidewall including an unattached upper end,
- a vessel top opening defined by said upper ends of said four sidewalls that substantially mimics the area of said base,
- a handle extending integrally and laterally from said back sidewall, and
- a spout extending integrally and laterally from said front sidewall, said spout being defined by:
- a concave base that extends integrally and laterally while sloping upwardly from said front sidewall, and
- a truncated triangular top opening having a first angled side portion, a second angled side portion and a front lip portion, said cover comprising a top surface and sidewalls depending therefrom:

said top surface being defined by:
- a back peripheral edge, a first side peripheral edge having a first forward end and a second side peripheral edge having a second forward end, which edges substantially mimic said back and side peripheral edges of said base,
- a first forward peripheral edge that terminates at a first inner end and projects from said first forward end normally of said first side peripheral edge and has a length less than the length of said front peripheral edge of said base,
- a second forward peripheral edge that terminates at a second inner end and projects from said second forward end normally of said second side peripheral edge and has a length equal to the length of said first forward peripheral edge,
- a first angled peripheral edge having a length less than the length of said first angled side portion and that terminates at a first front end,
- a second angled peripheral edge having a length equal to the length of said first angled peripheral edge and that terminates at a second front end, and
- a spout peripheral edge that connects said first front end to said second front end, charging said vessel with fluid feed,
covering said vessel with said cover, b. charging said vessel with juvenile psittacine feed, c. placing said cover over said feed charged vessel, d. placing said device relative to a juvenile psittacine to permit it to grasp said spout by its mandibles, e. manipulating said device to cause said charged feed to flow via said spout through said mandibles into the esophagus of said juvenile psittacine, f. continuing said feed flow while said juvenile psittacine is prompted by the touching of its mandibles to said spout to pump said feed down its esophagus, and g. removing said device from said mandibles upon consumption by said juvenile psittacine of a predetermined quantity of said feed.

* * * * *